UNITED STATES PATENT OFFICE.

HENRY J. RANDOLPH HEMMING, OF WASHINGTON, DISTRICT OF COLUMBIA.

PROCESS OF PRODUCING PURE OR MIXED AERIFORM ENVIRONMENTS.

970,623.

Specification of Letters Patent.  Patented Sept. 20, 1910.

No Drawing.   Application filed February 1, 1909. Serial No. 475,540.

*To all whom it may concern:*

Be it known that I, HENRY JOSEPH RANDOLPH HEMMING, late of the city of London, England, a subject of the King of Great Britain, a solicitor of England, at present residing at 1215 K street northwest, Washington, District of Columbia, have invented a new and useful Process of Producing Pure or Mixed Aeriform Environments, of which the following is a specification.

The main features of this invention are the production and maintenance of, and the method of producing and maintaining, any desired pure or mixed aeriform environments ranging in pressure from nearly (absolute) zero up to many atmospheres. It will be shown that gaseous pressures may be varied to adapt the process to obtain required results. It will appear that it affords a control over micro-organic life and metabolism by which, among other things, the following may be done:—(*a*) Micro-organisms may be deprived of their environmental gases, whether the same be in an aeriform or dissolved state, and so have their metabolic changes suspended; (*b*) micro-organisms may be subjected to environmental aeriform conditions as are optimum or barely tolerable or to any condition between these extremes. It will appear that gases may be disgorged and disengaged from substances; micro-organic life may be destroyed, assisted or inhibited and all forms of biochemical degradation may be either arrested or more or less controlled; organic substances may be protected from bacterial attack without heat or injurious chemicals; certain cellular organic changes may be either retarded, assisted, or varied; substances as water, wine, beer, fruit juices, etc., may be most efficiently saturated with any gas at pressure and packed and preserved as effervescent or still; and, such as flesh, fish, fruit, animal and vegetable juices, milk and other organic products may be preserved. This process will assist in the saturation of porous substances, *e. g.*, timber with preservative, fireproofing and filling materials; and skins, furs, leathers, corpses, metals etc., may be protected from or subjected to atmospheric and other gases.

For the arrestation and control of the varied forms of micro-organic activity and the suspension of the changes of such solid and liquid substances as are liable to biochemical degradation, many different and contrariant processes have been tried. As will appear, such depended, as far as their beneficial results were concerned, on the effect they had on the agents of biochemical change. This fact was generally not appreciated and the effects of such were often ascribed to causes other than the actual cause. As an example, the use of oxygen, in some instances, resulted in some substances remaining unchanged longer than if not subjected to treatment and the cause was ascribed to the "preservative" effect of the gas; whereas the direct effect (if any) was negligible and the result was due to the effect on the agents of biochemical change. Those races of bacteria (this term is generally intended to include yeast fungi and mold fungi as well as fission fungi) which do not thrive in an environment rich in oxygen were retarded in their metabolic changes and they were, so, unable to consume the substances so environed and the biochemical changes were partly delayed and partly due to races of bacteria not so intolerant of an abnormal proportion of oxygen. Oxygen was supposed to injure articles (beer, fruits) by "oxidation". Gases were used that a partial retardation of changes usual in organic products resulted and attempts were made to perfect the uses of such gases and so obtain the full advantage of the assumed preservative effect. But no practical means of obtaining an environment of any pure gas, for commercial purposes, has been worked out. Among the causes of failure have been: (*a*) the difficulty of dealing with "residual gases", that is, gases dissolved, occluded and condensed or otherwise absorbed and adsorbed in and on the products treated, and on the interior superficies of the containing receptacle and its connections—indeed in most, if not all, cases this difficulty was in no way appreciated; (*b*) the (practical) assumption that a low degree of pressure (in a chamber), say, from a quarter of an inch to two inches of mercury, was equal to a vacuum and so equivalent to the absolute withdrawal of all gases; and, (*c*) that gases were not commercially available that were pure.

To elucidate the state of producing high vacua reference is made to the manufacture of lamps in which light is produced by raising a filament to incandescence. In these cases the residual gases exercise a serious effect, particularly in high voltage lamps, and attention has been directed to the elimination of these residual gases so as to secure more perfect results. It has been shown that a long application of a low pressure gives better results than the mere reduction to the working pressure followed by immediate sealing. That is, such fixed or residual gases leave their location reluctantly. The importance of residual gases has not in a corresponding degree been appreciated by those whose processes depended, in fact, on their effect on micro-organic metabolism. These sources of difficulty were multiplied by ever varying factors, such as the bacterial flora present, the temperature, the kind of product treated and its condition and the personal factors which included the presence or absence of care, accuracy and cleanliness in working as well as the efficiency or otherwise of the apparatus employed. Consequently processes sometimes promised ultimate success but more often demonstrated failure and the users did not appreciate the causes of either.

It is necessary to a clear understanding of this specification and the state of the art of using gases for the purposes herein contemplated to point out that in the description of other processes the word "vacuum" is used although it is obvious that only a partial vacuum could be produced by the means indicated. In other cases the use of pure gas is directed although it is apparent that there was no real design either to obtain pure gases or to eliminate circumambient, dissolved, condensed, occluded and other residual gases so as to utilize the properties of the required gas or gases to the best advantage. There has been confusion in the application of gases to uses for some of the purposes herein contemplated.

The inventor knows of a number of attempts to achieve results, or rather some of them, that are the sequence of this process of producing gaseous environments of any desired pressure and of nearly perfect purity or of such mixture as the particular purpose requires. The researches of Pasteur and the practical application of the important Appert process showed that heat was sufficient to destroy, or effectively inhibit, bacterial development and the packing of cooked foods has proved a success. But from time to time processes involving the use of heat, as a basis of operations, have failed from unappreciated causes. Tins have bulged and bottles have burst without the reason for the failure being properly appreciated. Great care in the handling of the products resulted in a more uniform stability; it was also appreciated that it was of importance to hermetically seal the receptacles while at the boiling point; it was realized that the period of time and the degree of temperature to which materials were subjected to heat must be sufficient to paralyze bacterial action. But in many, if not all, processes the use of a degree of heat sufficient to alter the organoleptic properties of the treated product was unavoidable. Heat frequently injured bodies of the pepsin class as well as salivary excitants which give a zest to food and assist in its assimilation. Organic products, milk, for example, will remain stable indefinitely if drawn from a healthy cow under extreme conditions of bacterial cleanliness. The importance of the presence of air has been noticed but its deleterious action has often been attributed to some presumed power of causing putrefaction *per se* and it has not been practically appreciated that such gases are not *per se* deleterious but that they provide a viable environment for micro-organic life. Some processes involved the use of poisonous gases, generated by combustion of chemicals. Such a process has been applied to the preservation of animal flesh and fruits and has resulted in varying degrees of success. Such contradictory methods as expelling some of the atmosphere and introducing O have been adopted. Sulfurous dioxid, carbon monoxid and other gases have been empirically utilized. Their effect was sometimes to produce an atmosphere poisonous to bacterial life or in fumigation processes to deposit a poisonous film on the product treated and effect partial impregnation of the product and so to render bacterial growth difficult—perhaps particularly with regard to some classes of micro-organisms such, for instance, as the mucor or putrefactive or saccharine ferments—and to the extent to which bacterial life was interfered with, was a corresponding degree of preservation achieved. Or such gases formed an inert atmosphere which was not so much directly or positively poisonous as that it did not afford the conditions requisite to microbial metabolism.

To differentiate this invention from others it will be well to indicate some of the attempts that have been made to utilize gases for some of the purposes herein contemplated. Many of these processes have some merit and some of them some resemblance to this process but they fall short of the requirements of practical commerce. None are similar to the present invention. It has been sought by causing animals to inhale $CO_2$ to render their meat less liable to decay. Edible substances have been treated by adding to the cans in which it was afterward cooked hypophosphite of lime to absorb out of the tissues the last vestiges of air.

$CO_2$ has been utilized for carrying HCl, "in the form of spray", to organic substances under pressure. Organic substances have been enveloped in plaster of paris, "preservative coating" and "artificial skin". "to exclude all germs of bacilli as well as atmospheric influences" and "to prevent the access of germs from the air". Organic products have been subjected to various gases produced by chemical action and by combustion of drugs, spices and other aromatic products—including the gases produced by the dry distillation of onions. Foods have been subjected to a vacuum "as nearly as practicable". And perishable substances have been treated by radiant energy to destroy micro-organic life. A more promising process was one in which an air pump was used to exhaust the air from the pores and interstices of the food followed by the use of a "preserving gas"—a mixture of N and $CO_2$. The processes more particularly applied to the saturation of liquids with gases, either to produce effervescent beverages or to keep beverages from change due to micro-organic activity, will be referred to after the nature and qualities of $CO_2$ have been dealt with.

In some cases the efficiency of the process used depended (*inter alia*) upon the product being hermetically sealed, it was assumed that the vessels used were gas tight when such was not the case. This resulted in uncertainty and variability. Products so treated were subject to vicissitudes due to temperature, barometric pressure and other causes. To make the importance of this point clear it is stated that many experiments have shown that no receptacle made of wood such as could be produced for ordinary commercial purposes is really gas tight under very moderate pressures even if such vessels are ever in fact actually gas tight at any pressure at all. Such vessels may be easily "watertight" and yet in a few hours allow to leak through the pores a volume of gas equal to many times the quantity sufficient to fill them at the normal pressure. It does not appear to have been realized that it is equally as misleading to assume that a vessel, which permits gas to leak away, is gas tight and to work on that assumption, as it would be to assume a vessel to be watertight which allows that liquid to escape with equal facility. The fact that one phenomenon is visually plain and the other not may account for some of the confusion that has arisen. Further, the fact that a vessel may be easily germ proof without being water proof, much less gas proof, has probably assisted to erroneous conclusions as to the effect of excluding gases from substances liable to bacterial attack. If gases can pass through the pores of the wood in so short a time it is clear that the law of the intermiscibility of gases would secure the passage of gases exterior to such vessels with greater or less freedom and that such receptacles could not preserve any particular gaseous environment. The instability of wine in corked bottles, beer and cider in wooden casks, is in great measure due to the permeability of the containing vessel to gases and the temporary quiescence of imprisoned germs may be awakened or ameliorated by any factor which makes their environment more tolerable; hence, frequently, it happens that such liquids rapidly develop fermentative action and spoil when subjected to agitation or to variations in temperature or barometric pressure or other causes which tend to hasten the interchange or passage of gases between the exterior and interior of the vessel. Such conditions are sufficient to account for the instability of liquids when, as a sequence of being transported or on a change of temperature or for no actually observed cause, they undergo such changes as a fermentation or a rotting.

The limited keeping qualities of fermented liquors is largely due to the fact that in fermentation there is a production of $CO_2$ and this gas acts as a diluent of other gases and in its ebullition through and escape from the liquid it carries off a considerable proportion of the other gases so that the aeriform or dissolved gaseous contents of the product become less and less in proportion to the fermentation. The stability of such is partially due to the small oxygen in the product. It is not suggested that the presence of gas is of itself the cause of degradation but it does assist in forming conditions favorable to bacterial metabolism. Such factors as these are accountable for some, at least, of the varying results which occur in many processes for the preservation of organic substances. In cases where extraordinary care is observed the treated products are more equal in their keeping qualities but it is erroneous that cleanliness by itself will act as a means of preservation unless it extends to a bacteriological degree of exactness. But an environment in which bacterial metabolism is arrested is all effective to protect substances from the attacks of the agents of biochemical degradation. Those processes which most approximated a correct use of gases were those which were not persevered in, owing, no doubt, to the fact that a small deviation insured results extremely varying.

Difficulties have hitherto proved insuperable and no method for the treating and keeping of all organic substances has been made commercially available. The empirical means employed for ingestible substances have generally altered their organoleptic properties—for example:—plasmolysis by means of salt or sugar; subjecting the article to high degrees of heat; the use of agents of an injurious character, and (or) of a more or less reliable effect, for example, boracic acid which has been used for the temporary keeping of milk; or, inefficient in that the treated substances still afforded an environment consistent with the metabolism of microbic life, for example, milk and beer and fruit juices, as commonly packed in bottles and heated. Hitherto no process has been perfected by which to destroy or inhibit micro-organic life generally occurring in substances liable to change and which have been the subjects of attempted preservation, except such as rendered them either deadly, or more or less injurious, to man as well as to the microbe; or else, which altered their character and taste, as, for example, the use of heat for cooking and tinning.

No process has been commercially applicable by which to direct and control the stages of biochemical and cellular activity which are of importance in many industries, such, as, for example, to carry on to any desired extent and then determine fermentative changes in saccharine fluids, fruit juices, vegetable juices, etc., or to foster, for example, the chemical changes which the vital power of the cells of fruit induce in the process of maturation.

The conditions necessary for the proper treatment of substances so as to prevent and (or) control change have not heretofore been achieved. Without regard to temperature, success in the treatment of substances for human food depends on some or all of the following conditions. (1) When all (biochemical) change is to be arrested, the substance must be so processed that all organisms that have effected a lodgment are either inhibited or killed; but, when it is required to regulate and modify change—whether consequent on micro-organic life or on cellular activity—such an aeriform environment must be established as to allow desired change and retard other action; (2) the substance must be so packed as to protect it from any access of bacteria; (3) the substance must not be treated with any injurious preservative; (4) no material or organoleptic change (other than a transient one) must be induced; (5) for effervescent liquids the fullest saturation, at the pressure used, as well as the elimination of all undesired gases is of importance; (6) facility in sealing up any treated substance under wide limits of pressure, from nearly (absolute) zero to many atmospheres is requisite; (7) the substance (for example, soft fruits, eggs, etc.) must be packed so as to bear handling with as little injury as possible; and, (8) the receptacle must be of material incorrodible by any gases present or by the product preserved. These desiderata prohibit the use of heat, sugar, salt, and all poisonous and injurious chemicals—notwithstanding, the essential object can be achieved as the following explanation will show. The above conditions are generally imperative for the proper treatment of ingestibles, but in some cases the condition number (3) is of little or no importance, in other cases the condition numbered (4) need not be strictly observed and conditions (5), (6) and (7) are in many cases inapplicable.

In order to make the principles, on which the methods of applying this process depend, clear, it is explained that they are dependent on a practical appreciation and proper use of natural laws. These laws, while they may have been theoretically appreciated, have not, so far as their cumulative effect is concerned, been practically realized and efficiently used for the purposes herein described.

It is premised that the very kernel of this process in its application to the preservation of substances, is, to so control bacterial life as to cultivate it under optimum conditions, or, to inhibit it, or, to oblige it to follow a defined course. This may, or may not, as will hereafter become plain, preclude the use of any poisons, heat or other agents—indeed such agents may occasionally be conveniently ancillary to this process in one or more of its applications. The first fact of importance is that all living organisms are first debilitated and then ultimately destroyed by their own excretory products. Carbon dioxid, $CO_2$, is one of the excretory products of nearly all, if not all, living organisms. This gas, while very fatal to man if inhaled, is, when ingested (with liquids or solids), not only innocuous but often (if not always) beneficial. The use of this gas to paralyze the metabolic action of the agents of organic degradation in edibles and potables is therefore indicated. The time required to ultimately destroy the spores of some of the resistent bacteria may be such as to make it inexpedient to treat materials which are known to be infected with dangerous disease germs. This process is not relied on to make bad things good but to keep decomposable materials in as good a condition as at the time of treatment—or to inhibit bacterial metabolism. The longer micro-organic life is subject to an environment unfavorable to its metabolism the weaker it becomes until at last it ultimately succumbs.

The inhibition, by this process, of biochemical activity, including the absolute arrest of proliferation and metabolic change, may, for the practical purposes of protecting comestibles and potables from bacterial action which results in corruption and resolution, be divided into four grades or degrees as follows:—(1) such a treatment as involves the suspension of the functions of micro-organic life without (at once) involving its complete extermination; (2) a treatment which destroys some kinds of bacterial life and inhibits the rest; (3) a treatment which destroys all mature or cell forms of bacterial life without being fatal to all the immature or spore forms; and (4) a treatment which destroys all forms of micro-organic life. In all four cases the treated substances will, of course, be inclosed in hermetically sealed vessels. Perfect preservation would be consequent on the first treatment (that is if any change due to cellular activity or that sort of change due to proteolytic or unorganized ferments of which pepsin and enzyme are examples, be left out of consideration) and the last would involve absolute sterilization in addition. The second and the third would be between the first and the fourth. These four grades would not, in practical working, be clearly defined but would overstep each other, both with regard to the varying powers of resistance of different races of bacteria and their spores as well as with regard to the periods of time that would elapse before particular micro-organisms succumbed to varying gradations of treatment. If the object be to render innocuous any vehicle, such as water or milk, known (or suspected) to be bearing a particular pathogenic germ, then the grade of absolute sterilization, or at any rate, such a degree of sterilization as is known to be fatal to the germ in question, must be reached. In other cases inhibition (without complete sterilization) may be all that it is necessary or expedient to effect.

All living organisms must, for their existence, metabolism and multiplication, be supplied with at least four requirements which are:—(1) food or pabulum; (2) water, either in the form of a liquid or vapor; (3) heat, and (4) gas, either in gaseous form or in solution. In some cases the presence or absence of light is also an important factor. The presence or absence of these factors (*inter alia*) inexorably determine whether any form of life, from the highest to the lowest, including micro-organic life, shall flourish, remain dormant or quiescent, or perish. In the process of protecting substances from microbial attack it is obviously impossible to deprive micro-organisms of their pabulum for it is of the very substance which is to be kept or preserved. Likewise it is obviously forbidden to extract all aqueous moisture from such substances for that would (in the case of most substances) entirely alter their composition, character and appearance, and seriously modify their other organoleptic properties. It is also clear that it is impracticable to deprive such substances of all heat and keep them in a temperature of zero and it is cumbersome and expensive to keep such substances at so low a temperature as would destroy all forms of micro-organic life but, even if this is imperfectly done, as in "cold storage" the results of the process are frequently undesirable. This leaves the fourth requirement—the only one which can be controlled without (materially) altering the condition, character, appearance or other organoleptic properties of the product treated. As will hereafter be seen, it is not only practically possible to deprive an organic substance of its gaseous contents and environment but a new and lethal environment and saturation may be substituted therefor and thereby a double effect be produced.

The gas that nearly all, if not all, living organisms require, is oxygen gas, that is, "vital air". It is probably correct to affirm that life without air is impossible—that is the conclusion drawn by the inventor from a number of experiments. The requirements of micro-organisms of oxygen vary very considerably and the vital functions of some classes cannot be maintained in the presence of a moderate amount of this gas and their requirements are small—indeed in some cases minute. Another indication is, therefore, to eliminate all free oxygen—at any rate, to the extent necessary to produce an environment so free from this gas that micro-organic metabolism would be impossible therein. The places or locations where oxygen or other (objectionable) gases will or may be present include (a) the circumambient atmosphere, or gases in an aeriform condition in the containing vessel and in the pipes and chambers in connection therewith; (b) the gases absorbed or condensed on, absorbed or held in solution, and occluded in the liquid, semisolid, solid or other substance being treated in the containing vessel; (c) the gases absorbed or condensed on the interior superficies of the containing vessel and, (d) the gases in or on any cork, valve, seal or covering used to hermetically close the containing vessel. The gases referred to in (b), (c) and (d) are sometimes collectively spoken of as "residual gases".

By achieving the two objects before described a double effect on the micro-organisms present is insured, namely, the depriving them of a necessary or vital atmosphere and the subjecting them to a poisonous or lethal atmosphere, or to an inert or neutral and therefore a non-viable atmosphere. Besides, it will be clear from the following explanations that, when required, a particular atmosphere (which is not deadly to particular micro-organisms) may, after it has done its work on organisms that succumb to its influence, be easily replaced by another atmosphere and so by changing their aeriform environments to destroy different kinds of organisms in turn. Without absolutely affirming there are no exceptions, all forms of life require a greater or less supply of free gas, either in an aeriform state or in solution, including the micro-organic forms of life commonly called bacteria. The elimination, therefore, of all free gas would be fatal to many, if not all, forms of micro-organic life. But there is no known way of eliminating all traces of gas from organic substances, without destroying the character of such substances. This process (*inter alia*) uses a neutral or lethal gas as the means or agent to displace and eliminate another gas or gases favorable or necessary to micro-organic metabolism.

In using gases for the process now under consideration they should be selected with regard to the ultimate object to be attained. In the protection of edibles and potables from micro-organic attack objectionable gases like sulfureted hydrogen, $H_2S$, are obviously forbidden while on the contrary such a gas may be indicated in dealing, for example, with timber, both on account of its germicidal qualities as well as on account of its solubility. In manufacturing effervescent beverages an innocuous and very soluble gas is indicated, for example, carbon dioxid. In preserving liquids that are to be used still, the choice of a gas is wider. For cultivating some races of ferments and inhibiting others the choice of a gas or a mixture of gases must depend on the results required and the duration of the use of any gas or gases is to be similarly limited. As an instance of what is here indicated, it will be sufficient to cite the well known difference in the metabolic action of the common organism of alcoholic fermentation, the *Saccharomyces cerevisiae*, when it is working in an environment freely supplied with oxygen and when its environment contains comparatively little free or uncombined oxygen. In accelerating ripening changes in fruit or in staying, as far as expedient and practicable, all further change, the gas or gases used should be chosen so as to secure the end desired, for example, oxygen will assist in the ripening change including the production of sugar while carbon dioxid will not so much facilitate the production of sugar as it will the production of alcohol. In this way the process of ripening may be partially controlled and the character of the ripened fruits modified. In some cases the element of pressure is an important one and it may vary from a fraction of an atmosphere up to many atmospheres and temperature is also of importance particularly in connection with proteolytic changes but it is never necessary to employ such a degree of cold as is required when preservation is effected by refrigerating processes nor any degree of heat that would affect the product in any objectionable or undesired way. In ordinary cases of preservation the atmospheric temperature need not be varied.

Although oxygen gas in a free or uncombined state is necessary in varying proportions for the vital functions of most, if not all, forms of life yet this gas is itself very destructive to some forms of bacterial life when pure or unmixed with any diluting gas or even when considerably diluted. Man requires an atmosphere rich in this gas but even he cannot maintain life in an atmosphere of pure oxygen and varying proportions of it are necessary for the metabolism of diverse forms and conditions of life. This gas when present in excess is lethal to some forms of micro-organic life and so its use is indicated, either alone or with other gases, in such proportions as may be apt for the result desired or in sequence with any other lethal or vital gas or gases or with an inert, neutral or innocuous gas. This process, therefore, includes the use of this gas: (1) in a (practically) pure state and when no other gas is used: (2) in a mixture with other gases: and, (3) as a part of the process—preceding or following the use of other gases. It is to be distinctly understood that oxygen, while it frequently affords micro-organic life a viable environment and is sometimes the cause of non-success in empirically conducted processes, is a valuable germicidal agent, when properly employed. And further, it may be used alone or with other aeriform substances to assist in the production of optimum microbian conditions. It is also used for other purposes and in connection with the production of gaseous environments as will appear.

The difficulties of eliminating all free oxygen from any substance have hitherto not been dealt with practically and, probably, the necessity of its efficient elimination has not been wholly appreciated. So with regard to other dissolved, occluded and condensed or residual gases but their importance is generally, not so great as is that of "vital air" or oxygen. Pure atmospheres of a lethal gas have, consequently, not been obtainable so as to be practically available in the way contemplated by this specification. The uncombined oxygen normally present in water and milk and generally in all substances containing water, which include ingestible solids and liquids although in such quantities in the case of water as to suffice for the vital functions of fish seems to have escaped those who realized the necessity of displacing the circumambient atmosphere. No satisfactory means of compelling the substance treated to disgorge its dissolved gases has been perfected. The way in which it is proposed to displace uncombined or dissolved oxygen and any other dissolved, as well as circumambient, gases is by utilizing the properties of gases in such a way as to eject any undesired gas and then to secure any desired aeriform environment by the addition of another gas or gases and the process may be assisted by producing a rarefaction. This process may also be assisted by such substances as combine with or dissolve any gas present. In some instances the use of heat may be permissible for more efficiently eliminating any gas, particularly residual gases. By heating gases their germicidal effect, and perhaps their miscibility with other gases, is enhanced and hence the use of heat may be beneficial. Besides heat will assist in the dissociation of gases from other substances in proportion to the temperature used. So ethereal and fluid a substance as gas cannot be eliminated from matter which it has permeated by a substance to which matter is (practically) impermeable. When this process is applied to substances for ingestion an innocuous gas is required and, if possible, a very soluble one. Carbon dioxid is a convenient aeriform substance for the purpose—it being an innocuous, inodorous, (practically) tasteless and very soluble gas and yet, properly used, a potent germicidal gas. Other gases may be used as well as mixed gases.

It is stated that $CO_2$ in some liquids acts as a precipitant of some suspended and feculent matters and so renders their removal by sedimentation and (or) filtration more easy and this process of clarification is, by the present invention, improved.

Carbon dioxid is one of the most useful gases with which to treat substances and a knowledge of its properties is necessary to enable a proper use to be made of it as well as to interpret aright various circumstances and difficulties that arise during its use. The full advantages of this gas are so little understood that within a comparatively few years its use in connection with the preservation of liquids has been specifically negatived. Many who use this gas assume that its association with water is in the nature of a mechanical solution only. Various metallic carbonates are formed by this gas with metals in the presence of water and this and other facts show that this gas forms with water a true acid, thus,

$$CO_2 + H_2O = H_2CO_3.$$

Except for its action on metals, carbonic acid, as such, has not been appreciated in its relation to the process herein described. In treating ingestibles the use of $CO_2$ has been assumed to result only in a simple aqueous solution.

The inventor has made many experiments with liquids and found that $CO_2$ enters into an association with aqueous fluids in a different degree and manner when practically all other gases are eliminated therefrom than when they are not. Considering the fact that carbonates are so readily produced in conjunction with other phenomena it is safe to conclude that carbon dioxid does actually enter into chemical combination with water and form a new body. This body is carbonic acid and it is of unstable character and is even more unstable in the presence of dissolved air. This accounts for the long persistence of effervescence when a liquid is efficiently carbonated by this present process, for the unstable acid slowly breaks up into gas and water and it constitutes a reservoir from which the gas slowly escapes. It also accounts for the rapid way in which carbonated water becomes vapid when air is mixed up in the solution. The state of association of carbon dioxid with water is, therefore, not confined to simple solution. To what extent or proportion $CO_2$ associates with $H_2O$, either to form a new body or to form a simple solution is not, it is believed, yet determined. Generally with regard to solution, it may be stated that there are other phenomena which strongly suggest that solution is associated with a chemical process and it is believed that this fact accounts for some of the results which follow the more perfect solution ($q$. combination) of gases which takes place under this process. But it is clear that the association of $H_2O$ with $CO_2$, whether to form an acid or whether in simple mechanical solution, is an unstable one and it is this fact that accounts for the very great number of inventions and apparatus for the purpose of bringing $CO_2$ and $H_2O$ into more rapid, intimate and permanent association. In many processes some of the circumambient air and dissolved gases was either incidentally or deliberately got rid of and in some of the apparatus used there was provision made for eliminating, to a more or less effective degree, the foreign gases. It was realized that the presence of foreign gases was one of the factors against proper carbonation. Accordingly, other processes were more directly designed to meet this difficulty and vacuum apparatus was employed. Before aqueous liquids can be induced to accept the maximum quantity of $CO_2$ (under any given conditions) it is necessary first to eliminate all the atmospheric gases. The presence of a foreign gas acts as a disturbing element with the result that $CO_2$ enters more reluctantly into solution or combination and escapes much more suddenly and violently when the retaining pressure is released. The present invention is designed (inter alia) to overcome all these difficulties and to remove from any aqueous liquid all foreign gases to an extent quite unapproached by any previous practical commercial process. By means of alternating pressures, aqueous liquids may have their gaseous contents discharged to a degree that has hitherto been practically impossible. An aqueous liquid so deprived of its dissolved gases may be compared to a squeezed sponge and in that condition it will absorb with avidity any soluble gas that may come in contact with it. It is this property of water that makes it so difficult to obtain gas free water and to keep it gas free unless it be hermetically seated in an impervious vessel.

As has been pointed out, $CO_2$ in water forms a weak acid this fact is of great practical importance. In the first place it prohibits the use of any metal or substance, which can form carbonates or is otherwise corrodible by $H_2CO_3$, in any receptacle or in any pipes, valves or fittings in connection therewith with which ingestibles treated by this gas may come in contact. It is probably this fact that accounts for apparently contradictory phenomena when milk is treated by $CO_2$. In the case of fresh milk the use of this gas does not show any tendency to form a curd in the milk but in the case of milk that has so far progressed toward decay that a considerable proportion of lactic acid is present the use of $CO_2$ will form a curd. The weak $H_2CO_3$ seems to be unable alone to curdle milk but when it is assisted by lactic acid it does so.

It is well known that acids have a very destructive effect on micro-organic life and it is probable that it is largely due to the formation of $H_2CO_3$ that carbon dioxid exhibits such marked antiseptic properties. This being assumed, every precaution should be taken to secure the formation of as much $H_2CO_3$ as practicable so as to get the utmost possible germicidal effect of this acid. This involves (*inter alia*) the elimination of foreign gases as already pointed out. The use of an aeriform substance to produce or procure an atmosphere or environment free from any vital or otherwise objectionable gas affords an efficient and effective means of accomplishing the purpose, as the following explanations will show. The method of use involves a mode of displacement and the gas used, that is, the displacing gas, is so used as to displace (for its own accommodation) or eliminate other gases from the substances treated. It is obvious that the circumambient air or gases in any given vessel may be nearly all displaced (neglecting that which may happen to be in solution in such substance and the residual gases) by filling that vessel with such a body as water, oil or other liquid but the use of water or oil or any such thing for preserving purposes is clearly negatived because the difficulty of getting rid of such a body (after it had fulfilled its purpose of displacing the undesired gas or gases, in order to make room for the required gas in an unadulterated state) would be practically insuperable. But the use of such a substance as water or other liquid is insufficient to displace either the gases held in solution or the residual gases and a liquid would have little or no effect in compelling either a solid or another liquid to disgorge its dissolved gases or otherwise to obtain their evacuation and such an inexpert operation could not be efficiently assisted by bringing pressure to bear on the substances under treatment. No form of air pump yet known is efficient to produce a vacuum and, heat and chemical action being prohibited, it follows that an aeriform substance of an innocuous nature is indicated for the work and a gas is the kind of body that peculiarly possesses the physical properties of being able to search out, occupy and fill every space to which it can gain admission. It is true that a gas (as compared with a liquid) cannot at once displace another gas but, owing to its nature, it intimately commingles with any other gas with which it may be brought in contact. This law of the intermiscibility of gases is taken advantage of in the process now being elaborated as the explanations afforded demonstrate.

A property of gases that is of supreme importance to this process is that of their solubility. The fact that gases are soluble in liquids and that the degree of their solubility is dependent, amongst other things, on pressure and temperature, so permitting the point of saturation being easily varied, renders possible the evacuation of dissolved and residual gases to a very high degree of efficiency. Another property of gases that is used in this process to assist in obtaining pure aeriform environments of any desired gas is the property of their compressibility or elasticity. The practical use and application of the above recited properties of gases with reference to this invention are now shown and illustrated as follows:—Any convenient vessel, containing the product under treatment, is first exhausted by an air pump or other rarefaction means, down to the pressure limited by the capacity of the apparatus used and (or) by the result desired. Four fifths of the aeriform contents of the containing vessel may be extracted with great facility and an efficient vacuum apparatus will with ease extract twenty nine thirtieths or even a greater proportion. In some cases it will be desirable not to subject the products under treatment to too sudden variations of pressure, as will become plain from the explanations hereinafter given, and the process should be graduated. In the description immediately following the original aeriform substances in the containing vessel are referred to as the first atmosphere; the aeriform contents after the first exhaust process are referred to as the second atmosphere; the aeriform contents after the first pressure followed by the first release as the third atmosphere; next, the second exhaust gives the fourth atmosphere; the second pressure followed by the second release the fifth atmosphere; and so on.

It is assumed that the volume of the displacing gas, from time to time present, is understood as forming part of the so called atmospheres without further express mention. To continue, the way to the outlet is closed and the way to the inlet opened so admitting the displacing gas, from a cylinder or other source, to the containing vessel—at a predetermined pressure. At this stage the vessel contains an admixture of gases which consists of (say) one-thirtieth of its first atmosphere and the displacing gas—the quantity being determined by the pressure used and the temperature. On opening communication with the atmosphere or with a connected chamber, hereinafter called the exhaust chamber, in which the pressure is an atmospheric or a low one, the pressure within the vessel rapidly accommodates itself to the atmospheric pressure or the pressure within the exhaust chamber, as the case may be, with the result that some of the gaseous contents of the vessel pass away into the atmosphere, or into the exhaust chamber, leaving its second atmosphere in the containing vessel. The imprisoned gases being intimately commingled it follows that the quantity of gas so passed away, evacuated, driven out or displaced, is proportionate (at alternate stages) to the quantity of the displacing gas that was admitted to the vessel and that its amount or volume is dependent on the difference between the pressure used and the atmospheric pressure, or the pressure in the exhaust chamber, as the case may be. To make this clear it is now assumed that some substance is being treated, such as milk or meat, contained in a suitable receptacle and that the gas used as the displacing gas and also as the impregnating gas, is carbon dioxid (of absolute purity) supplied from a cylinder of compressed gas; it is further assumed that the compressibility of this gas is such that for each atmosphere of pressure (that is about 15 lbs. to the square inch) on extra volume of gas is compressible into a space that is capable of containing only one volume at the ordinary atmospheric pressure. For the present purpose it is also assumed that the carbon dioxid is being used at a pressure of 150 lbs. to the square inch, which is approximately equal to 10 atmospheres. But the pressure required in actual working may be subject to considerable variation, say, from 2 or 3 atmospheres up to 8 or 10 or more atmospheres, depending on the nature of the substances treated, the result desired, the strength of the containing vessel, temperature, etc. Forcing liquid preservatives into permeable substances is instanced as a case where a comparatively low pressure may suffice while a high pressure may at times be expedient; the treatment of ingestibles which include such diverse products as animal flesh, fruits, vegetables, fish, charcouterie, cakes biscuits, sweets (patisserie), water and all varieties of beverages require a pressure varying from, say, 3 or 4 (or less) up to 8 or 10 atmospheres; and, higher pressures may be used for other purposes or whenever required. It is also assumed that the compressibility of the atmosphere in the containing vessel and its contents, at the commencement of operations and which it is required to displace, is equal to that of the carbon dioxid—this would not in fact be strictly accurate.

The process is now described and its application and its efficiency mathematically demonstrated with reference to the assumed pressure of 150 lbs. to the square inch. The first use of the vacuum apparatus (on the premises stated) leaves one thirtieth of the original atmosphere—constituting the second atmosphere. Next, on communication being established with the gas supply the pressure instantly proceeds to rise from one thirtieth of the normal or atmospheric pressure up to 150 lbs. to the square inch and, on this pressure being reached, it is clear that ten and twenty nine thirtieths volumes of carbon dioxid will have passed into the vessel which, with the one thirtieth of the original volume of atmosphere, make up the eleven volumes of gas required to develop the pressure of 150 lbs. to the square inch above the normal or atmospheric pressure. Next, the supply of gas being shut off and the way to the atmosphere opened, it is clear that 10 volumes of the imprisoned gas will escape and with and included in these ten volumes will be ten elevenths of the second atmosphere—which includes one thirtieth of the first atmosphere—and ten elevenths of the displacing gas. This is the third atmosphere and it contains one three hundred and thirtieth of the first atmosphere. By now establishing communication with an air pump at least twenty nine thirtieths of the present gaseous contents of the vessel may be easily withdrawn. This step produces the fourth atmosphere which comprises the displacing gas and the one ninety nine hundredth of the first atmosphere. It is obvious that a repetition of these steps will very rapidly and efficiently reduce the original aeriform contents of the vessel to a quite negligible quantity and must, unless it is assumed that matter is infinitely divisible, in a very short time get rid of the very last removable atom of the original gas. The successive steps can be rapidly performed and the tenth atmosphere would only contain a fraction of the first atmosphere represented by the quantity $$\frac{1}{355776300000}$$

and the twentieth atmosphere would only contain $$\frac{1}{139234453205859000000000000}$$

of the first atmosphere. Such a repetition of varying pressures is a leading feature of this invention.

The complete elimination from a substance of a dissolved gas is a work generally requiring very severe treatment of the substance and even heating water to its boiling point is not necessarily effective to discharge all dissolved gases from it. Further there are micro-organisms which require very small quantities of atmosphere or vital air but by this process and the repetitions thereof, the original atmosphere can easily be displaced without heat or injurious chemicals so that so minute a fraction (if any) remains as to be absolutely beyond the power of the most delicate chemical reagents to detect. The whole atmosphere can ultimately be eliminated and this fact is capable of mathematical demonstration. The dissolved or occluded gases and the "residual gases" within the treated substance and the containing vessel may not be quite so rapidly eliminated but, as explained below, the circumambient gases would disappear even more rapidly. It will be expedient to allow some time to elapse, say, 2 or 5 or 10 minutes or an hour or even a day, between the last stages of treatment in order that the gases dissolved or occluded in different products may become intermixed with the displacing gas and so ready for ejection from the containing receptacle and this also applies to the "residual gases". Neither the process of gaseous saturation nor that of disaeration is a sudden one but they take some time—the allowance of such a time is hereinafter called a "rest". The important fact to be borne in mind is that the physical condition of the residual gases is such that they are more or less strongly fixed to other substances and that they are not so free as the circumambient or aeriform gases—their molecular mobility is diminished—and time and (or) an increase (very moderate) of temperature may be used to assist in their removal. While the process is going on the proportion of the displacing gas in the containing vessel is increasing with great rapidity so that in a comparatively few movements the displacing gas will form a new aeriform environment in the containing vessel closely approximating a theoretical state of purity. When the displacing gas is intended to act directly as a germicide it can, under such favorable circumstances, exert its full effect, because its action is not modified by a mixture of either vital or inert gases.

Inasmuch as in the practical application of this process the arrangement of the containing vessels will be such as to permit a stream of gas to pass through them seriatim, the elimination of the original gaseous, or atmospheric, contents of the containing vessels will be even more rapid than that described for the gas that is first displaced will be comparatively rich in atmosphere and poor in the displacing gas until, as the process proceeds, the proportion of the displacing gas will increase as the proportion of the original atmosphere diminishes. It is apparent that this process is perfect to a degree far beyond that requisite to take full advantage of gases of the quality at present commercially available and therefore it is important to use the purest gases obtainable and to bear in mind that an impurity in the gas used, amounting to one part in a million, would be sufficient to render more than a few alternations of the described steps futile. It is also important to obtain vessels that are efficiently gas tight.

The practical application of these principles in the use of a gas—not necessarily carbon dioxid, although that gas will frequently be used in the treatment of ingestibles—for the purpose of eliminating, evacuating, displacing and disgorging all other gases from the product treated and its containing vessel as well as the aeration and saturation of such products with any desired gas is as follows:—It will be observed that the properties of solubility, compressibility, expansibility and miscibility of gases are all of importance to this process. Further in the case of carbon dioxid which can enter into chemical combination with water, the combining power of the gas is very important. For the sake of simplicity the process is described as applied to some substance contained in a single receptacle; such a substance may be water, beer, milk, fruit juice, jelly, fruit or meat or other solid or liquid substance; at the same time it is to be understood that the word "receptacle" whenever it occurs in this specification and in the claims annexed hereto is to be taken to mean and include not only a single capacity, receptacle, vessel or chamber, which may vary in size from a large room or chamber to a bottle, but also any convenient number of such receptacles suitably connected so that they and their contents may be all subjected to simultaneous treatment.

In the various applications of this process gases will frequently be used for two main objects; the first, as a means or agent for displacing and eliminating any other gas and, the second, when a gas is chosen on account of some special quality, for example, for its lethal effect or for producing an effervescent beverage or to produce a special environment, and it will frequently happen that one kind of gas will serve both objects. It will be convenient to call a gas that is used for the first named object a "displacing gas" and a gas that is used for any other purposes an "impregnating gas".

Now to return to the process, the substance, without being subjected to any preliminary process is put into any suitable receptacle. The receptacle is then hermetically closed. It should have one or two, preferably two, orifices which will permit of the influx and efflux of gas to and from the interior. One of these, the inlet orifice, is connected to a suitable source of gas. The other provides for any confined gas a means of egress to the atmosphere or into any suitable connected vessel. Both these orifices may be small and should be connected with ways or channels controlled by taps. To proceed, the way to the inlet orifice is opened and the gas admitted into the receptacle at a predetermined pressure and then, on opening the way from the outlet orifice, the gas rushes into and through the receptacle carrying with it nearly all of the circumambient air that was imprisoned in the receptacle and in the ways and channels connected therewith. The outlet orifice should be next closed and so the contents of the receptacle subjected to the action of the gas at the pressure determined on until such time as a considerable degree of impregnation has taken place. Now, at this stage, the contents of the receptacle hold in solution, in addition to the oxygen and other gases that they originally held, an abnormal quantity of carbon dioxid. On closing the way to the inlet orifice and opening the way from the outlet orifice the pressure in the receptacle will equalize itself with the outside pressure, therefore, the substance in the receptacle will thereupon become supersaturated and incapable of holding the whole of its gaseous contents. The treated substance, therefore, disgorges or evacuates its superfluous gases which escape through its body to the surface and so into the air space within the receptacle and then into the outer atmosphere or connected vessel— exhaust chamber—as the case may be. In case of liquid substances this process may be accompanied with noticeable effervescence but solid substances may show no visible indication of the phenomenon. The gas that escapes through the outlet orifice is a mixture of the atmospheric gases which the treated substance originally held diluted with the displacing carbon dioxid. Carbon dioxid besides being more soluble than other gases usually held in solution, is at the commencement of this stage present in great excess both in solution and in the confined circumambient atmosphere, consequently, by its more easy solubility and also by the ebullient disturbance it occasions in effecting its own escape it displaces other gases. When it is desired to obtain a greater range of varying pressures, to expedite and facilitate the process, the outlet orifice should be connected with means for reducing the pressure as low as practicable. The effect of the use of this provision is to bring the contents of the receptacle under a pressure less than that of the atmosphere, whereupon, again, results a condition of supersaturation and, consequently, a further ebullition or disgorging of the dissolved or retained gases.

The process may be initiated by a step of exhaustion and the exhaustion may be repeated after every saturation. Such a step of exhaustion is hereinafter referred to as a "rarefaction". The effect of reducing the pressure below the normal is, among other things, to secure a more extensive range of pressures and to increase the tension of supersaturation. The methods described of obtaining varying and lower points of gaseous supersaturation is a leading feature of this invention. By alternations of pressure, the gaseous contents of the substance under treatment may be expeditiously evacuated. When liquids are being treated both the disgorgement and the saturation may be assisted by suitable agitation. This mode of saturation and disaeration of liquids by gases is extraordinarily efficient and it differs, both in the principles involved and in the results produced, from other processes. In the ordinary type of aeration machines the agitation proves an effective means for mixing liquids with the atmosphere as well as with the gas used for aerating. The use of a "snift" valve does not substantially alter the relative proportions of the aerating gas and the original gases—its use is practically confined to relieving the pressure though in some instances, for example, in siphon filling machines, the repeated use of the snift valve may be more effective. The next step is to close the way from the outlet orifice and open the way to the inlet orifice. The substance under treatment has had its original aeriform environment removed; it has been deprived of a large proportion of its originally dissolved and (or) occluded gases; it has become impregnated with, a larger proportion of carbon dioxid than it originally contained; it is now environed by a (practically) pure gas; and all contact with exterior gases is stopped.

The original gases having been largely eliminated, the treated substance has become more apt for a new solution and it can, under equal conditions of temperature, pressure, time etc., dissolve more carbon dioxid than it was originally capable of doing. The substance under treatment is more absorptive and receptive than it was and on the carbon dioxid being readmitted a greater quantity of it enters into solution and becomes intimately commingled with any remaining traces of the original gases—both circumambient and in solution. This method by which a more greedy absorption of the displacing gas is obtained, is of great importance. On again closing the way to the inlet and opening the way from the outlet the supersaturated gases again effervesce and escape away and the small vestige of the gases originally dissolved becomes more and more inappreciable. Again, communication should be opened with the exhaust chamber. When the steps above described have been repeated as often as the desired object requires, the containing vessel is hermetically sealed and the contents thereof will be found to be preserved, impregnated or saturated, as the case may be. What has taken place is that the original vital gases have been displaced and one of the most mephitic or lethal gases known substituted. The new environment within the receptacle is inconsistent with any form of bacterial life and the agents of putrefaction, souring, decomposition, change and decay, and other forms of degradation due to biochemical activity, being inhibited, there is nothing present, with the possible exception of such bodies as the proteolytic ferments, to cause change and so stability is insured.

In the foregoing description of this process the fact that $CO_2$ combines with $H_2O$ to form an acid has not been repeated or referred to. It will be understood, however, that this acid is not without importance either as a germicide, or as a valuable adjuvant to the organoleptic properties of the product treated, or as a factor in the production of a beverage having effervescent properties in greater perfection than any beverages produced under other practical processes. The fact that in some liquids, such as beers and wines, a slow change takes place, which is probably due to the action of such bodies as enzymes and peptones, is not overlooked and it is not claimed that the present process interferes with this kind of change. In the case of substances in glass vessels sunbeams and even diffused daylight possess chemical or actinic rays whose effect, especially under long continued exposure, is sometimes considerable both upon the color and constitution of such bodies. In this explanation it has been assumed that only one vessel of contents is treated at a time, when the process is applied on a commercial scale this will not be the case. Different circumstances and requirements attend the handling of dissimilar articles, such as, meat, fish, fruit and milk and the manufacture of aerated waters, beers, etc. It is often expedient to modify the application of the principles. When the vessel containing the substance to be treated is a bottle both the orifices required must be near the mouth of the bottle and the mouth must be in hermetical contact with a chamber having such orifices but in other cases it is desirable that the influx of the gas should be at the lowest part of the vessel and the efflux at the highest. In the treatment of organic substances having a delicate cellular structure care should be taken to avoid too sudden a fall in the pressure or the dissolved gases, in suddenly assuming an aeriform state and violently escaping through the cell walls, will rupture and break down the organic structure and the general appearance and consistency of the product will be changed. This, in many cases, is merely a mechanical and not a chemical effect; but in the case of the cells of fruit, each of which is a living unit, such a rupture would injure their vitality. Such products as fruits are possessed of life, both as a whole and in each and every cell—somatic and cellular life. This process may, or may not as desired, destroy such life and then the vital action of the fruit will cease. This will not much affect the proteolytic ferments but all ripening changes will cease.

Most organic products are, if in a healthy condition, sterile—for example, milk in the udder of a healthy cow, the blood and meat of healthy animals and the juice and flesh of grapes and other fruits are free from micro-organic life. It is only when such products come in contact with a germ laden atmosphere or are otherwise infected that they become liable to putrefaction. When it is desired to preserve fruit and at the same time to assist the cellular action which accompanies the natural process of ripening the following points are important:—The fruit should be handled with care, packed in suitable receptacles and sealed in an aeriform environment containing such a proportion of gases, at such a pressure, as is best adapted to treat the particular kind of fruit and to its state of ripeness. If the fruit is quite ripe or it is desired to retard the formation of saccharine products the gas should be nitrogen or some gas that will not provide the cells of the fruit with material for forming carbo-hydrates. The changes which the cellular life of the various fruits bring about when packed under this process vary very considerably. Bruised fruit, or very soft fruit that is required for use as pulp, may be treated with an aeriform environment that not only prohibits all micro-organic activity but which does not afford the means for undesired cellular change and in the case of such products there is no need to avoid a sudden lowering of the pressure. The shells of eggs will burst if no attention is given to the gradual lessening of pressure. When the process is used for the preservation of eggs in bulk this precaution will be unnecessary. This process may also be used in conjunction with heat or innocuous substances, for example, sugar, salt, acids, alkalies, etc. In this way cooked or prepared foods, fruits and jams, sauces, chutneys and condiments, preparations of meat and the like, may be preserved.

In preserving or aerating on a commercial scale the containing vessels, after being packed and hermetically closed, may be connected up together in large numbers. In the case of aeration in bottles the apparatus may hold many bottles and each bottle must be in connection with two ways; the outlet from the first bottle leading to the inlet to the second bottle and the outlet from the second bottle leading to the inlet to the third and so on. Such an apparatus should have a means of agitation necessary to produce a continual changing surface of the liquid to expedite saturation. In preserving fruit, flesh, fish, liquids etc., on a large scale the containing vessels, after being suitably packed, may be coupled up to one another in series. The inlet to the first vessel should preferably be situated at its lowest part and the outlet at its highest. The inlet to the second vessel must be connected with the outlet from the first and so on. It will be convenient to have a valve between each vessel. In this way large quantities may be dealt with efficiently and with a minimum of time labor and gas.

The methods above detailed will afford, in addition to preservation or (and) aeration a convenient way of packing substances in vessels for commercial distribution. Such vessels need only be opened when the contents are required. When it is desired to treat organic substances in large quantities suitable gas tight chambers of any required capacity should be provided and the process applied as before described.

Now follows a description of this process as applied to the treating and manufacture of beverages. It is assumed that the liquid is to be fermented but in order to avoid repetition it is pointed out that omitting the steps relating to fermentation, the process is applicable to liquids that are only intended to be preserved and aerated. In order to get good results it is necessary to fully control the fermentation. The ultimate character of the wine, beer, cider, perry and the like is more dependent upon the fermentation being successfully accomplished than upon any other step. Heretofore this process has been carried on, to a greater or less extent, empirically and the results have been dependent on processes based on experience but modified by fortuitous conditions. A brew has in many instances not been free from liability to some untoward mishap that may either have resulted in total loss or in a greater or less deterioration of the ultimate product. Unappreciated causes have been the occasion of beer becoming acid and the empirical practice of the brewer has not availed to give him intelligent control over his process of manufacture. It will make this explanation more clear if it is pointed out that from time immemorial the brewer has consciously leavened his wort by adding yeast or ferment to it, while the vintner has just as certainly, but unconsciously, leavened his must by bruising his grapes and so mixing with the grape juice the fermentative germs which adhere to the exterior of the grapes and stalks but in neither of these cases did the manufacturer appreciate the reasons for his success or the causes of his failure.

This process affords an additional means for the culture of pure races of ferments and, the fermentative process may be subject to fuller control and to protection from the foreign and accidental ferments which have hitherto been the cause of much trouble and loss. The empirical success of the various modes of fermentation have in the past been largely due to favorable forms of ferments taking such effective possession of the beer, wine, etc., as to render the presence of the comparatively few unfavorable ferments, as may have accidentally gained access, inappreciable. Now, the wort having been prepared and hopped is conveyed to coolers, refrigerators, fermenting vats and other vessels as may be convenient and necessary for the particular purpose required. Provision is made for mixing with it any desired ferment also for such aeration or oxygenation as may be expedient during fermentation. This may be all done in closed vessels and without the admission of any impure races of yeast or other undesirable micro-organisms. The steps of satturation and evacuation above described are carried on as required and the process of fermentation can be assisted or retarded at will and generally controlled in that particular aeriform environment which may be best adapted to secure the results desired. Thus either high or low fermentation may be accelerated or checked or moderated and that with the help of such a temperature as expediency may require. It may be convenient to assist the removal of the liquids from vessel to vessel by means of suitable pumps but the proper manipulation of the taps and valves together with the pressure of the gas will very expeditiously force the liquids under treatment in any desired direction. All the operations may thus be carried on in closed vessels, in optimum aeriform environments, absolutely free from liability to bacterial infection and the gas used and produced may be easily collected for examination or it may be stored for use. The steps of evacuation and saturation may be assisted by suitable agitation. In some instances, however, agitation may be obtained by the passage of a gas entering the liquid being treated and rising through it. The various steps of the process will be carried on under conditions of control not hitherto achieved. The liquids dealt with may be heated, cooled, mixed with ferments, fermented, filtered, saturated with or evacuated of gases at pleasure and that without atmospheric contact or any chance of microörganic infection. The fermentation will be subject to control and desired results may be regularly secured. A greater variety of alcoholic beers and other beverages may be produced and that with varying proportions of alcohol. An entirely new and extensive variety of "non-alcoholic" beers, wines, ciders and other beverages may be manufactured. Saccharine and other liquids—including milk—may be treated with pure races of yeasts and that without contamination and pure races of wine, beer and other ferments and yeasts may be cultivated, maintained and exclusively used. Beers and other beverages subjected to this treatment will be in good condition and may be fit for immediate consumption. Yeasts and ferments may be collected in a nearly pure state for future use and so the full advantage of a special or pure culture be secured. The gas used, for example, carbon dioxid, may be collected. The product may be either sparkling—effervescent—or still and in either case its keeping qualities will be excellent. The enumeration of these applications is not intended to be exhaustive but it is made to indicate variations in the applications of this process that may be necessary or expedient to secure particular results. Various kinds of fermentative organisms produce a fermentation and flavor generally peculiar to themselves and this process offers a means of taking advantage of their individual qualities.

It will be understood that the application of this process to wines and other liquids will achieve hitherto unapproachable results. Old wines (or any other liquids) may be treated with added sugar to any required degree and yet preserved from further fermentation. The elimination of foreign gases by this process coupled with the added organoleptic properties supplied by $CO_2$ in solution and combination is of much value. It should be clearly understood that effervescent wines, for example, champagne, owe not only their effervescent qualities to $CO_2$ but their flavor, piquancy and character are much enhanced by and are very largely due to this gas and the more intimately it is associated with the liquid and the higher the saturation the better the product. This explanation will show the application of this process to a large class of wines and fruit juices without repeating the various steps in detail. Such beverages may be either still or sparkling ones.

The treatment of cream, first by destroying or inhibiting unfavorable germs and then inoculating it with cultivated ferments, a "starter", so as to produce butters of the highest and best flavors will be clear. This is additional to the mere protection of cream from injurious bacterial action. Cheese, which is dependent on bacteria for its ripening, may be more successfully made by first treating the milk and afterward adding a culture of the right bacterial flora so that the curd will not be affected by undesirable organisms and will be ripened by selected organisms.

The fact that benign races of ferments are already cultivated commercially for many purposes, for example, wine, beer and butter making, is well known but this invention affords additional means of control and other advantages. In some cases, for example, the keeping or storage of seeds for cultural purposes, care should be taken that they are sufficiently dried and packed in a dry vessel previous to treatment and that the gas and alternations of pressure used do not injure their vitality or stop their respiration. But it is to be distinctly understood that it is only necesary to get rid of (excessive) moisture when the presence of water or vapor would tend to promote some undesirable change of a biological, chemical, biochemical or actinic nature. If such substances are properly dried there will be no need to apply this process with the care that is necessary when the conditions are favorable to micro-organic metabolism.

In the assisting in the impregnation of any porous material, such as timber, with any liquid preservative it is well to add that it may be expedient to saturate the material with the selected aeriform substance before bringing it into contact with the liquid preservative and then afterward to repeat the alternations of pressure as may be necessary. The mutation of the pressures, with the inherent qualities of the gases, will both displace the atmosphere and drive the preserving liquid into the innermost accessible pores of the material. It is known that condensed gases, for example, air, have been used for a somewhat similar purpose but such alternations of pressure as above described have not hitherto been practically applied—nor has a gas been used as a displacing agent or chosen for its soluble qualities as appears in the above description. A gas soluble in the preservative with which it is desired to permeate a porous substance will, on the release of pressure, effervesce and so tend to cover the interior of every cellular space or pore with a coating of the preservative. The same process may be used in order to permeate wood or other substance with a material to fill the pores and so render such substances water and (or) gas and fire proof. Wood used for casks and other vessels and manufactures may be so treated that the pores will be filled up and such vessels will be water and gas tight in proportion to the efficiency with which the process is performed and the quality of the materials used; besides such wood will be better for very many purposes besides being more durable.

It will be apparent from the foregoing explanations that many of the processes heretofore in use for the impregnating of such products as timber with preservatives will be improved by using gases in the described instead of, or in partial substitution for, the high degrees of heat which are much used with such processes. By this process injury to the fiber of the material by heat will be avoided and its saturation with the preservative used be efficiently accomplished. A degree of heat sufficient to keep the preserving substance in a fluid condition may be necessary and alternating pressures of much importance. Various materials of a solid and semisolid character, such as, oils, fats, wax, resin, tar, pitch, etc., and mixtures of such may be used at any convenient or necessary temperature so as to permeate the material with a substance which on cooling sets in the pores of the substance and forms a solid mass.

The application of this process, when mere preservation is required, for example, to skins, furs, silks, feathers, leather, cotton, wool, corpses, etc., may be gathered from the above description but for many purposes any suitable lethal or neutral gas or gases may be employed. The protection of polished metal and delicate machinery from the action of the gases of the atmosphere and their imprisonment in an inert atmosphere may be secured in a similar way. For such purposes as these last mentioned the selection of the gas or gases is not confined to innocuous gases as is the case when ingestibles are being dealt with.

The application of the process when the object is to store or keep a substance or material and preserve its aroma, for example, hops, in any desired atmosphere is clear from the explanations given.

For some purposes the applications of this process may be varied in a way not before detailed. When it is desired to bring some substance under the influence of any gas or gases this process may be used in order both to eliminate gases that would prove deleterious as well as to introduce any other gas or gases in any degree of purity and in any proportions. Such uses include the preparation and preservation of all aerated beverages, such as, water, fruit juices and saccharine liquids; all medicinal and mineral waters; liquids and beverages that are, or may be aerated; and the manufacture or preparation of solutions of gases, for example, ammonia, whether such solutions be in water or in any other liquid. As explained, gases may be used for the driving out of any material other gases and then the material may be sealed in an extremely attenuated atmosphere of any chosen gas. Many, if not all, of the natural mineral waters may, with proper compounding, be so closely imitated that the productions under this process of aeration and preservation will be in every respect as valuable as the natural product and with a better effervescence than has before been practicable. Tonic foods and beverages, either with or without drugs, of the most putrescible and corruptible nature, may be preserved and, as an example, the use of raw meat juices and albumen mixed with such substances as wine and milk and compounded with any desired drugs are indicated.

For many purposes and particularly in the preparation and preservation of such compounds as last mentioned and for the treatment of milk, the use of some mechanical means of breaking up, or atomizing, or emulsifying, or homogenizing the substance treated, may be combined with this process. Milk treated by this process soon after it is drawn from the cow will have such a low bacterial content, at the time of treatment, as to be and remain in good condition for various commercial purposes. The application of heat will not result in such rapid souring and putrefaction as ordinarily happens for the agents of such changes will have been checked. So the use of a lower degree of heat will be possible and the process of desiccation may be slower by which a better product will be obtainable. This equally applies to milk compounded with such substances as cereals and other organic compounds.

In case during manipulations connected with this process a liquid foams or froths excessively the foam may be broken by spraying the surface with some of the liquid drawn from the main body or a gas pressure will instantly subdue the "head."

The process above described and various applications of it will afford new methods of scientific investigation. Germicidal agents, either gaseous, liquid or solid, and such as electricity and heat, may be employed to destroy or inhibit all forms of micro-organic life or only certain races of bacteria (leaving others alive) with the object of cultivating the surviving organisms or otherwise investigating bacteriological physiology. The action of pure gases, or mixtures of gases, including their properties of solubility, occlusion, and condensation, as well as the reverse steps of these phenomena, and their power of forming other compounds, may be investigated under pressures from nearly zero up to any pressure the apparatus used will sustain. The method by which this may be done is by first eliminating from a suitable closed receptacle all traces of any aeriform substance which it may at first contain by the use, in the manner before described, of a displacing agent which should be a like gas to the one to be investigated or, if more than one as in the case of a mixture of gases, a part of such mixture and the contents of the vessel should then be subjected to a rarefaction and the aeriform substance to be investigated passed into the vessel at any desired pressure. Other substances and reagents may be introduced into the said vessel either before or after such elimination, for the purpose of examining any interaction between the gas being investigated and other bodies. Such a vessel may be used with electrical, acoustic, or optical appliances.

Though certain uses and applications of this invention have been indicated yet it is to be understood that such are put forward only as examples and illustrations of the ways in which this process is intended to be utilized and not as a statement or catalogue of its many applications. Further, it is to be understood that the sequence of the various steps or stages of the process as well as their number and the duration of the time of their application may be varied without departing from the principles on which this invention is based. The use of gases is not broadly claimed but it is intended to secure protection for such limited and special uses as are intended to be indicated, covered by, or included in, the above description.

What I claim is—

1. The method as hereinabove described of eliminating and discharging from a closed receptacle nearly the whole, if not absolutely the whole, of its aeriform contents—its original or "first atmosphere" which method comprises the passing into the receptacle a "displacing gas" from a suitable source of supply, at a convenient pressure, say, five atmospheres or more; closing the connection with the source of supply and releasing the gas from the receptacle so that the pressure therein declines to normal; closing the outlet and again passing the displacing gas into the receptacle as before; repeating these steps until the first atmosphere is so thoroughly eliminated that any remaining trace thereof is inappreciable; and, finally, adjusting the quantity of gas within the receptacle to such expedient pressure, between an atmospheric pressure and the pressure available from the source of gas supply, as may be required, and hermetically sealing the receptacle; substantially as and for the purposes set forth.

2. The method as hereinabove described of eliminating and discharging from a closed receptacle nearly the whole, if not absolutely the whole, of its first atmosphere which method comprises the exhausting the receptacle of its aeriform contents so as to leave a low pressure therein, say, equal to one inch of mercury or even a greater pressure; closing the connection with the rarefaction apparatus and passing into the receptacle a displacing gas from a suitable source of supply, at a convenient pressure, say, five atmospheres or more; closing the connection with the source of supply and releasing the gas from the receptacle so that the pressure therein declines to normal; closing the outlet, and, again, exhausting; repeating these steps until the first atmosphere is so thoroughly eliminated that any remaining trace thereof is inappreciable; and, finally, adjusting the quantity of gas within the receptacle to such expedient pressure, between the capacity of the rarefaction apparatus and the pressure available from the source of gas supply, as may be required, and hermetically sealing the receptacle; substantially as and for the purposes set forth.

3. The method as hereinabove described of eliminating and discharging from a closed receptacle nearly the whole, if not absolutely the whole, of its first atmosphere which method comprises passing into the receptacle a displacing gas from a suitable source of supply, at a convenient pressure, say, five atmospheres or more; closing the connection with the source of supply and releasing the gas from the receptacle so that the pressure therein declines to normal; closing the outlet and exhausting the receptacle of its aeriform contents so as to leave a low pressure therein, say, equal to one inch of mercury or even a greater pressure; closing the connection with the rarefaction apparatus and, again, passing into the receptacle the displacing gas as before; repeating these steps until the first atmosphere is so thoroughly eliminated that any remaining trace thereof is inappreciable; and, finally, adjusting the quantity of gas within the receptacle to such expedient pressure, between the capacity of the rarefaction apparatus and the pressure available from the source of gas supply, as may be required, and hermetically sealing the receptacle; substantially as and for the purposes set forth.

4. The method as hereinabove described of producing in a closed receptacle a practically, if not a theoretically, pure environment of any gaseous substance, which may be either a pure gas or a mixture of any two or more gases, at any desired pressure, ranging from nearly (absolute) zero up to a pressure of many atmospheres which method comprises exhausting the receptacle of its aeriform contents to a low pressure of, say, one inch of mercury or even a greater pressure, allowing a "rest"; closing the connection with the rarefaction apparatus and passing into the receptacle the gaseous substance of which a pure atmosphere is required, from a suitable source of supply, at a convenient pressure, say, above five atmospheres, and then a further rest; closing the connection with the source of supply and releasing the pressure in the receptacle so that it declines to normal; closing the outlet and, again, exhausting; repeating these steps until the first atmosphere, including the "residual gases", is entirely eliminated or so reduced in quantity that any remaining trace thereof is so small as to be inert; and, finally, sealing the receptacle at any desired pressure; substantially as and for the purposes set forth.

5. The method as hereinabove described of protecting organic liquids from bacterial attack which method comprises conveying the liquid to be treated into a suitable closed receptacle; exhausting the aeriform contents thereof to a low pressure of, say, one inch of mercury or even a greater pressure; subjecting the liquid to agitation so as to facilitate the elimination of dissolved gases; closing the connection with the rarefaction apparatus and passing into the receptacle a gas to act as a displacing agent, at a convenient pressure, say, five atmospheres or more, then further agitating the liquid to effect a more complete solution or association of the gas therewith; closing the connection with the source of gas supply and releasing the pressure in the receptacle so that it declines to normal; closing the outlet and, again, exhausting as before, then further agitating the liquid; closing the connection with the rarefaction apparatus and passing into the receptacle a suitable non-respirable or poisonous gas, at a convenient pressure, say, five atmospheres or more; repeating these steps until the free and removable gases which were originally dissolved or associated with the liquid are so completely disgorged and eliminated that any remaining trace thereof is incapable of supporting micro-organic respiration and also until the liquid is saturated with the non-respirable or poisonous gas which is used in the later steps; and, finally, sealing the receptacle at any expedient pressure within the capacity of the apparatus used; substantially as and for the purp es set forth.

6. In the manufacture of highly effervescent, gased and well carbonated beverages including therein saccharine liquids and fruit juices and medicinal and other mineral (properly so called) waters the method as hereinabove described which comprises obtaining or preparing the liquid to be treated and conveying it into a suitable closed receptacle; exhausting the aeriform contents thereof to a low pressure of, say, one inch of mercury or even a greater pressure; subjecting the liquid to agitation to facilitate the elimination of dissolved gases; closing the connection with the rarefaction apparatus and passing into the receptacle carbon dioxid, at a convenient pressure, say, four atmospheres or more, then further agitating the liquid to induce a full saturation of the gas therewith; closing the connection with the source of gas supply and releasing the pressure in the receptacle so that it declines to normal; closing the outlet and, again, exhausting as before, then further agitating the liquid; repeating these steps until the free gases originally associated with the liquid are practically eliminated and thereby its receptivity for a new gas largely increased; then, finally, saturating the liquid, at any expedient pressure, with the kind of gas or gases required to produce the desired result and hermetically sealing the receptacle; substantially as and for the purposes set forth.

7. In the clarification of beers, wines, ciders and other fermented beverages, as well as fruit and vegetable juices and infusions the method as hereinabove described which comprises conveying the liquid to be treated into a suitable closed receptacle; passing carbon dioxid into the receptacle, preferably at its lowest point, at a convenient pressure, say, four atmospheres or more; preferably using agitation in addition to that due to the ebullient action of the gas; closing the inlet and releasing the pressure in the receptacle so that it declines to normal; closing the outlet and exhausting the aeriform contents of the receptacle to a low pressure of, say, one inch of mercury or even a greater pressure, accompanied with further agitation; closing the connection with the rarefaction apparatus and, again, passing carbon dioxid into the receptacle as before; the liquid so supersaturated is now allowed to stand until the suspended substances become precipitated; and, finally, decanting or filtering the liquid as may be expedient; substantially as and for the purposes set forth.

In testimony whereof I have signed my name to this specification in the presence of two witnesses.

H. J. RANDOLPH HEMMING.

Witnesses:
  Percy H. Russell,
  Fred. Luke.